United States Patent [19]

Inoue et al.

[11] 4,185,997
[45] Jan. 29, 1980

[54] PROCESS FOR TREATING BASIC CONVERTER SLAG

[75] Inventors: Katsuhiko Inoue, Takarazuka; Tsutomu Ikeda, Kobe, both of Japan

[73] Assignee: Kobe Steel Limited, Hyogo, Japan

[21] Appl. No.: 787,429

[22] Filed: Apr. 14, 1977

[30] Foreign Application Priority Data

Apr. 15, 1976 [JP] Japan .................................. 51/43341

[51] Int. Cl.² .................................................. C21B 3/04
[52] U.S. Cl. ........................................ 75/24; 423/594
[58] Field of Search ............... 75/24, 30; 241/24, 79.1; 65/19, 20; 106/117; 423/594

[56] References Cited
FOREIGN PATENT DOCUMENTS 679397 4/1950 United Kingdom ........................ 75/24
1083581 9/1967 United Kingdom .

Primary Examiner—M. J. Andrews
Attorney, Agent, or Firm—Oblon, Fisher, Spivak, McClelland & Maier

[57] ABSTRACT

Treated basic converter slag and a process for treating basic converter slag are disclosed, in which untreated slag in a molten state is subjected to an oxidation treatment and basicity adjustment treatment by the addition of a material containing $SiO_2$, so that iron or manganese components may be converted into forms which allow easy recovery thereof, and detrimental phosphorous components are retained in other phases. As a result, iron or manganese components may be effectively recovered, without inclusion of phosphorous components.

7 Claims, 4 Drawing Figures

PROCESS FOR TREATING BASIC CONVERTER SLAG

BACKGROUND OF THE INVENTION

1. Field of the Invention

This invention relates to a treated basic converter slag and a process for treating the basic converter slag, and more particularly to the slag and a process of the type described in which iron or manganese components are converted into forms which allow easy recovery thereof.

2. Description of The Prior Art

In general, basic converter slag contains about 10 to 20% (by weight) iron in terms of a total iron content, and the amount of slag produced is considerably large. Hithereto, many attempts have been proposed for the recovery of iron from slag by crushing and mineral processing techniques for the reuse of slag as an iron resource. However, the recovery yields attained are extremely low, and the result is that only a portion of the slag is recovered, while a majority of the slag is used only for reclamation purposes.

A difficulty encountered by the mineral processing recovery technique lies in that a majority of the iron component contained in basic converter slag is present as divalent wustite, and that the phosphorus components which are detrimental components for the reuse of slag are apt to remain in the slag, without being removed therefrom.

As indicated in Table 1, the composition of untreated slag after the completion of the converter steel making process substantially consists of five phases, i.e., a di-calcium silicate, tri-calcium silicate, wustite, lime, and di-calcium ferrite including titanate which is in the form of a solid solution therein (Di-calcium ferrite and titanate perovskite solid solution, hereinafter.). In addition to these components, luppe, $CaF_2$ (fluorite) and calcium aluminate are present in the slag in small amounts. (Meanwhile, the aforesaid tri-calcium silicate and lime are present only in slag of a high basicity.) As can be seen from Table 1, a majority of iron components other than iron droplets are present in both phases of wustite and di-calcium ferrite perovskite solid solution, and iron components other than iron droplets are all non-ferromagnetic, thus not allowing screening and recovery by a magnetic separation process. On the other hand, the phosphorus components which are detrimental in this case are present principally in the di-calcium silicate phase. (In this respect, if $CaF_2$ is added in a great amount, the phosphorus components are present in the form of calcium fluoro-phosphate.) In this manner, the iron components present in untreated slag are dispersed in the aforesaid phases, respectively, while the oxidized states thereof vary, so that a chemical separation technique is quite difficult to apply. In addition, a magnetic separation process is not useful for the separation of iron components other than iron droplets, because of their non-ferromagnetic properties.

SUMMARY OF THE INVENTION

It is accordingly a principal object of the present invention to provide a treated basic converter slag and a process for treating basic converter slag, which avoids the technical shortcomings in the reuse of slag as iron or manganese resources, thereby achieving an effective recovery of slag.

It is another object of the present invention to provide treated basic converter slag and a process for treating basic converter slag, in which basic converter slag is treated in a manner that iron or manganese components may be crystallized into forms which allow easy recovery thereof, while detrimental phosphorus components are retained in other phases, thereby efficiently recovering iron or manganese components without the inclusion of phosphorus components.

According to the first aspect of the present invention, a treated basic converter slag is provided containing a Mg-Mn ferrite phase and a di-calcium silicate phase as the main mineral constituents.

According to the second aspect of the present invention, treated basic converter slag is provided as defined in the first aspect of the invention, in which the treated basic converter slag further contains at least one di-calcium ferrite-perovskite solid solution and $\beta$-wollastonite phases.

According to the third aspect of the present invention, treated basic converter slag is provided as defined in the first aspect of the invention, wherein the aforesaid treated basic converter slag provides a basicity of $CaO/SiO_2 = 1.5$ to 2.5 (molar ratio), and wherein the ratio of iron distributed in the Mg-Mn ferrite phase to the total iron of the aforesaid treated basic converter slag is not less than 25%.

According to the fourth aspect of the present invention, treated basic converter slag is provided as defined in the third aspect of the invention, in which a preferred range of the basicity, i.e., the $CaO/SiO_2$ molar ratio, ranges from 1.7 to 2.3 and the preferred ratio of iron distributed in the Mg-Mn ferrite phase to the total iron of the treated basic converter slag is not less than 40%.

According to the fifth aspect of the present invention, a process for treating basic converter slag is provided, which comprises the steps of subjecting basic converter slag in a molten state to an oxidation treatment and a basicity adjusting treatment by the addition of a material containing $SiO_2$ to achieve a basicity ratio, $CaO/SiO_2$ of 1.5 to 2.5, cooling and solidifying the slag, thereby achieving a slag product containing a Mg-Mn ferrite phase and a di-calcium silicate phase as the major mineral constituents, such that the ratio of iron distributed in the Mg-Mn ferrite phase to the total iron of the treated basic converter slag is not less than 25%.

According to the sixth aspect of the present invention, a process for treating basic converter slag is provided as defined in the fifth aspect of the invention, in which the treated basic converter slag after cooling and solidification further contains at least one di-calcium ferrite-perovskite solid solution and $\beta$-wollastonite phases.

According to the seventh aspect of the present invention, a process for treating basic converter slag is provided as defined in the fifth aspect of the invention in which oxygen is blown into slag at a rate of over 10 $Nm^3$/molten slag ton in an oxidation treatment.

According to the eighth aspect of the present invention, a process for treating basic converter slag is provided as defined in the fifth aspect of the invention, in which the preferred range of basicity, i.e., the $CaO/SiO_2$ molar ratio, ranges from 1.7 to 2.3, and wherein the ratio of iron distributed in the Mg-Mn ferrite phase to the total iron of the treated basic converter slag is not less than 40%.

Figure 1:
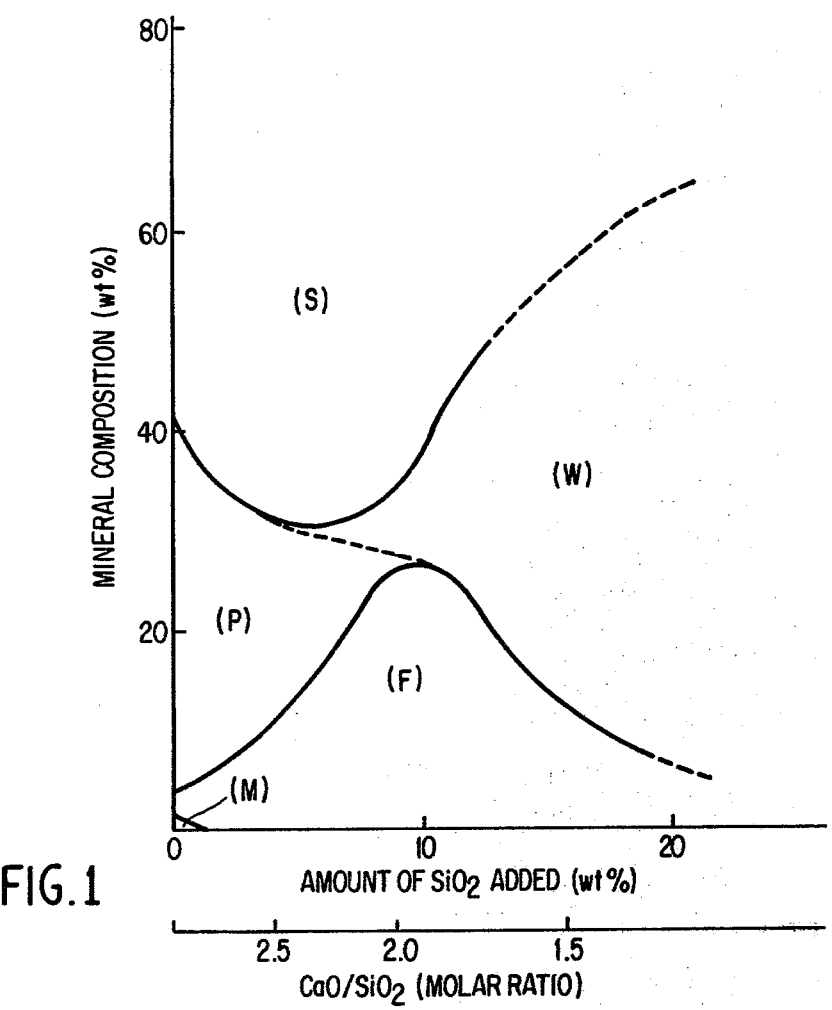
FIG. 1 is a plot representing the relationship between the $CaO/SiO_2$ molar ratio and the composition of mineral phases, when $SiO_2$ is added to oxidized basic converter slag in the molten state.
Figure 2:
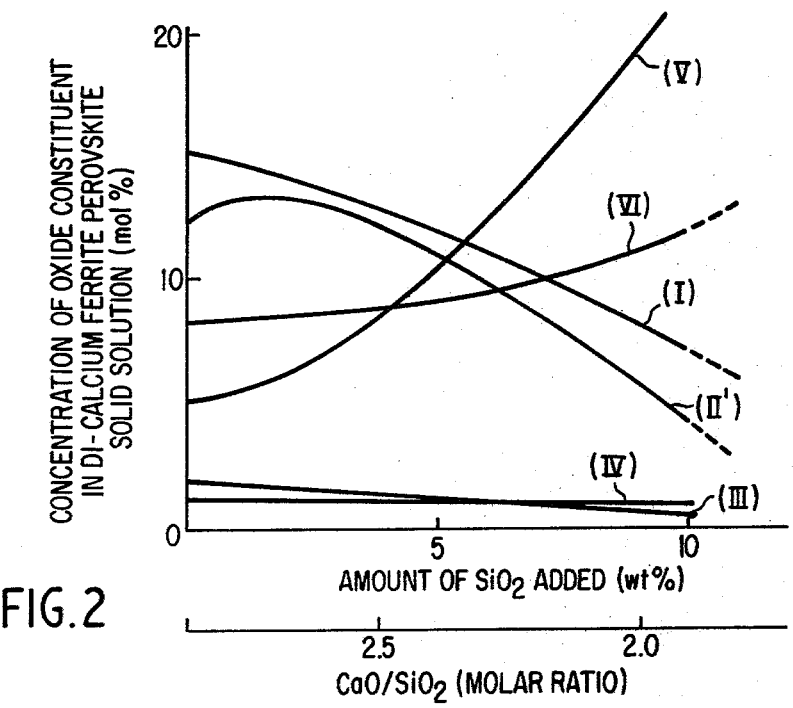
FIG. 2 is a plot showing the relationship between the $CaO/SiO_2$ molar ratio of slag and concentration of respective oxides in a di-calcium ferrite perovskite solid solution, when $SiO_2$ is added to oxidized basic converter slag in the molten state.
Figure 3:
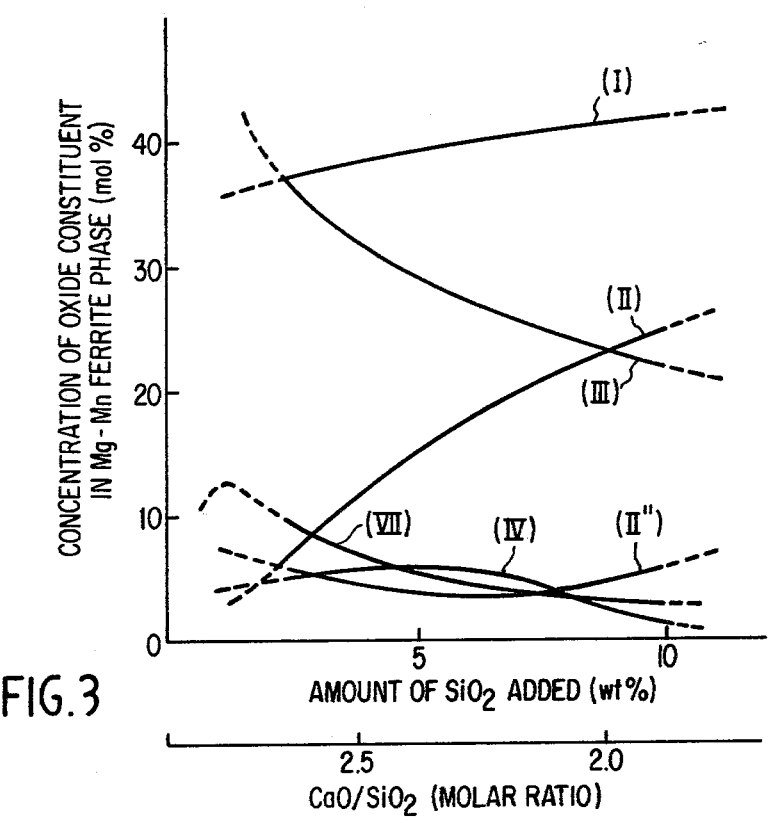
FIG. 3 is a plot representing the relationship between the $CaO/SiO_2$ molar ratio and the concentration of respective oxides in the Mg-Mn ferrite phase, when $SiO_2$ is added to oxidized basic converter slag in molten state.

[The reference characters appearing in FIG. 1 to FIG. 3 are as follows: F ... Mg-Mn ferrite phase; P ... di-calcium ferrite perovskite solid solution; S ... di-calcium silicate phase; W ... $\beta$-wollastonite phase; M ... magnesia phase (periclase); I ... $Fe_2O_3$; II ... MnO; II' ... $MnO_2$; II'' ... $Mn_2O_3$; III ... MgO; IV ... $Al_2O_3$; V ... $TiO_2$; VI ... $SiO_2$; VII ... CaO.]

DETAILED DESCRIPTION OF THE PREFERRED EMBODIMENTS

The present invention is directed to the reasonable solution of technical problems associated with a basic converter slag by treating basic converter slag for reuse of the slag as a useful resource, and in addition, the present invention is based on various studies from various viewpoints of chemistry, physics and mineralogy on the characteristics and properties of basic converter slag.

According to the process for treating molten basic converter slag, of the present invention, untreated basic converter slag is oxidized, and then the slag is adjusted to an appropriate basicity, with the result that iron components contained in the slag are all crystallized in the form of a solid solution in a ferro-magnetic Mg-Mn ferrite phase, thereby permitting magnetic separation, while phosphorus components such as $P_2O_5$ are all crystallized in the form of a solid solution in a di-calcium silicate phase. Thus, both iron components and phosphorus components are separated from each other because they are in different phases thus permitting recovery of iron components alone, by a simple magnetic separation process.

More particularly, according to the process of the invention, an oxidation treatment is applied to untreated slag, so that divalent iron components in the slag are converted into trivalent iron components, while the composition of the mineral constituents of slag and the distribution of respective elements over respective phases are varied as shown in Table 2.

In other words, the FeO present in slag is converted into $Fe_2O_3$ thereby producing $Ca_2Fe_2O_5$, while MnO is oxidized into $MnO_2$, thereby producing $CaMnO_3$, and then a di-calcium ferrite perovskite solid solution $[(Mg,Ca)_2(Al,Fe)_2O_5$—$Ca(Si,Ti,Mn)O_3$ solid solution], is produced by combining with calcium which remains in excess after the production of $Ca_2SiO_4$. In addition to the di-calcium ferrite perovskite solid solution, the above oxidation treatment results in the formation of a Mg-Mn ferrite phase which is ferro-magnetic.

It has been a general practice to blow oxygen gas into molten slag in the oxidation treatment. In short, any material, either liquid or solid, may be used, as far as it is a material containing oxygen, which may oxidize basic converter slag. When oxygen gas is blown into the slag, the blowing rate of oxygen should be not less than 10 $Nm^3$/molten slag ton.

Table 1

| phase | Mineral phases in untreated slag (by Wt %) | | | | | | | | | |
|---|---|---|---|---|---|---|---|---|---|---|
| | Mineral composition | MgO | $Al_2O_3$ | $SiO_2$ | $P_2O_5$ | CaO | $TiO_2$ | MnO | FeO | $Fe_2O_3$ |
| di-calcium silicate | 30 | | | 31 | 1 | 65 | | 0 | 0 | |
| $Ca_2SiO_4$—$Ca_3P_2O_8$ | ~60 | | | ~33 | ~3 | ~66 | | ~1 | ~1 | |
| tri-calcium silicate | 0 | 0.5 | | 23 | | 70 | | 0.5 | 2 | |
| | | | 0.4 | | 0.5 | | | | | |
| $(Mg,Ca,Mn,Fe)_3 SiO_5$ | ~30 | ~1.0 | | ~25 | | ~73 | | ~1.5 | ~3 | |
| wustite | 10 | 10 | | | | 10 | | 10 | 45 | |
| $(Mg,Ca,Mn,Fe)O$ | ~40 | ~20 | | | | ~30 | | ~20 | ~55 | |
| lime | 0 | 1 | | | | 75 | | 2 | 5 | |
| $(Mg,Ca,Mn,Fe)O$ | ~10 | ~3 | | | | ~90 | | ~10 | ~15 | |
| di-calcium ferrite perovskite solid solution | 5 | | 3 | | | 62 | 10 | | | 5 |
| $Ca_2(Al,Fe)_2O_5$—$Ca(Si,Ti,Mn)O_3SS$ | ~20 | | ~5 | | | ~65 | ~25 | | | ~20 |

Table 2

| Phase | Mineral phases in oxidized slag (by Wt %) | | | | | | | | | |
|---|---|---|---|---|---|---|---|---|---|---|
| | Mineral composition | MgO | $Al_2O_3$ | $SiO_2$ | $P_2O_5$ | CaO | $TiO_2$ | MnO | $MnO_2$ | $Fe_2O_3$ |
| di-calcium silicate | 40 | | | 31 | 1 | 65 | | 0 | | 0 1 |
| $Ca_2SiO_4$—$Ca_3P_2O_8$ | ~60 | | | ~33 | ~3 | ~66 | | ~1 | | (FeO) |
| di-calcium ferrite perovskite/solid solution $(Mg,Ca)_2 (Al,Fe)_2O_5$-$Ca(Si,Ti,Mn)O_3SS$ | 30 | 1 | 0.5 | 3 | | 57 | 2 | | 10 | 13 |
| | ~ | ~ | ~ | ~ | 0.3 | ~ | ~ | — | ~ | ~ |
| | 40 | 5 | 2.5 | 9 | | 60 | 5 | | 13 | 20 |
| Mg—Mn ferrite | 0 | 35 | 2 | | | 4 | | 0 | | 35 |
| $(Mg,Ca,Mn)(Al,Mn,Fe)_2O_4$ | ~5 | ~50 | ~5 | | | ~8 | | ~7 | | ~45 |

Table 2-continued

| Phase | Mineral phases in oxidized slag (by Wt %) | | | | | | | | | |
|---|---|---|---|---|---|---|---|---|---|---|
| | Mineral composition | MgO | Al$_2$O$_3$ | SiO$_2$ | P$_2$O$_5$ | CaO | TiO$_2$ | MnO | MnO$_2$ | Fe$_2$O$_3$ |
| periclase | 0~2 | 100 | — | — | — | — | — | — | — | — |

According to the present oxidation treatment, iron components are converted into trivalent oxides which afford ferromagnetism. As is clear from Table 2, a di-calcium ferrite perovskite solid solution contains detrimental phosphorus as a solid solution, and hence cannot be used as an iron resource as it is. To the contrary, Mg-Mn ferrite provides a high iron-content and is free of phosphorus, and therefore is an excellent resource for iron. However, the amount of the Mg-Mn ferrite phase is as low as 0 to 5%. This is because magnesium and manganese which are divalent cations of a spinel structure constitute the Mg-Mn ferrite phase, and because manganese is preferentially located in six coordinated site in a di-calcium ferrite perovskite solid solution in the form of Mn$^{4+}$, with the result that what essentially remains as a constituent for the formation of a Mg-Mn ferrite phase is only Mg. Moreover, in the concentration of Fe$_2$O$_3$ in slag is small, then MgO may be crystallized.

In the present process, subsequent to the aforesaid oxidation treatment, the basicity of the slag is adjusted, such that the slag is converted into a slag which comprises (i) a ferrite phase, in which iron and manganese components are crystallized in the form of a solid solution, and (ii) a di-calcium silicate phase which contains phosphorous components in the form of a solid solution. As a result, the separation of detrimental phosphorous components as well as the recovery of iron or manganese components by a magnetic separation process is easily possible. In other words, when SiO$_2$ is added to the molten slag which has been subjected to the aforesaid oxidation treatment, CaO contained in the di-calcium ferrite perovskite solid solution is consumed by combination with SiO$_2$, commensurate to the amount of SiO$_2$ added, so that di-calcium silicate is produced, with the result that calcium ions are present in only small amounts, with the resulting reduction in the amount of di-calcium ferrite perovskite solid solution. FIG. 1 is a plot showing the variation in composition of mineral phases, when SiO$_2$ is added to molten basic converter slag which has been oxidized. As can be seen from FIG. 1, the amount of the di-calcium ferrite perovskite solid solution [(P) in FIG. 1] is reduced with an increase in the amount of SiO$_2$ added.

As can be observed from FIG. 2, the concentration of manganese components (Curve II') and iron components (Curve I) contained in a di-calcium ferrite perovskite solid solution are reduced with an increase in amount of SiO$_2$ added.

On the other hand, MnO$_2$ which fails to produce a di-calcium ferrite perovskite solid solution is reduced to a divalent state and partly to a tri-valent state, and occupies a divalent site in ferrite, along with magnesium. Similarly, Fe$_2$O$_3$ is crystallized in the form of a solid solution in the ferrite phase. As can be observed from FIG. 3, the concentration of manganese components (Curve II) and iron components (Curve I) contained in the Mg-Mn ferrite phase are increased with an increase in amount of SiO$_2$ added, and as can be seen from FIG. 1, the amount of Mg-Mn ferrite phase (F) as well is increased. Accordingly, manganese and iron components contained in the entire slag are crystallized in the form of a solid solution in the Mg-Mn ferrite phase in an accelerated manner.

Figure 4:
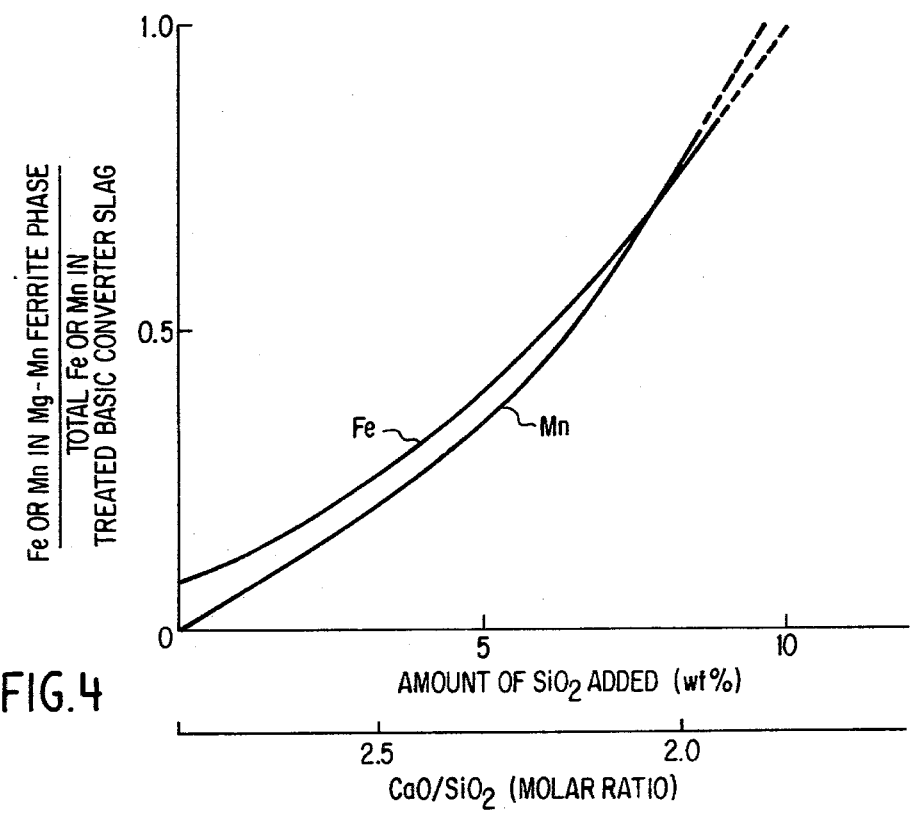
FIG. 4 is a plot showing the relationship between the $CaO/SiO_2$ molar ratio and the ratio of iron or Mn distributed in the Mg-Mn ferrite phase to the total iron or Mn in the treated basic converter slag.

FIG. 4 is a plot representing the relationship between the CaO/SiO$_2$ molar ratio and the ratio of iron or Mn distributed in the Mg-Mn ferrite phase to the total iron or Mn of the treated basic converter slag.

The amount of Mg-Mn ferrite phase in slag as well as the amounts of iron and manganese contained in this phase are dependent on the amount of SiO$_2$ for a given slag composition, and are maximized when the CaO/SiO$_2$ molar ratio reaches a value near 2, although these amounts vary to some extent according to the ratio of MgO, MnO and Fe$_2$O$_3$ because of the site preference property of the respective ions.

In other words, by adding SiO$_2$ to molten slag in a manner such that the ratio CaO/SiO$_2$ becomes about 2, a basic converter slag containing as the main mineral constituents (i) a di-calcium silicate phase (S in FIG. 1) in which a majority of the phosphorous component (P$_2$O$_5$) is present in the form of a solid solution, and (ii) a Mg-Mn ferrite phase (F in FIG. 1) which is ferro-magnetic and contains a majority of the iron and manganese components in the form of a solid solution may be obtained.

For the addition of SiO$_2$, any material which contains SiO$_2$ or any material which produces SiO$_2$, when added to molten slag, may be optionally used. Included in the former are silica sand, blast furnace slag, and the like, and in the latter are alloys such as Si-Mn, Fe-Si and the like.

For maximizing the amount of Mg-Mn ferrite, as above-mentioned, the value of CaO/SiO$_2$ contained in the slag should be adjusted to about 2, or range from about 1.5 to 2.5, preferably from about 1.7 to 2.3. As can be observed from FIG. 4, the ratio of iron distributed in the Mg-Mn ferrite phase to the total iron of the treated basic converter slag, which corresponds to a range of basicity of CaO/SiO$_2$, is found to be not less than 25% and 40%, respectively. In case the amount of SiO$_2$ added is excessive, then there shortages of calcium arise thereby producing a di-calcium silicate phase, so that, as can be observed from FIG. 1, $\beta$-wollastonite CaSiO$_3$ (W) is produced, and hence the amount of wollastonite is increased with an increase in the amount of SiO$_2$, i.e., a reduction in CaO/SiO$_2$. The wollastonite phase may form a solid solution in a continuous manner with di-calcium ferrite perovskite solid solution and may solute magnesium, manganese, iron and the like, with the result that the amount of Mg-Mn ferrite phase (F) is reduced with an increase in the amount of the $\beta$-wollastonite phase (W). For this reason, the addition of an excessive amount of SiO$_2$ is not preferable.

Meanwhile, the order of oxidation treatment and basicity adjustment should not necessarily be limited to this order, because the basicity adjustment may follow the oxidation treatment. Alternatively, both treatments may be carried out at the same time.

For achieving effective reuse of basic converter slag as a preferable iron resourse, it is necessary to treat the slag which contains as principal mineral constituents (i) a Mg-Mn ferrite phase, in which iron and manganese are crystallized, and (ii) a di-calcium silicate phase which contains phosphorus in the form of a solid solution. It is desirable that the total amount of the above phases occupy about not less than 70% of the total constituents of the slag. This may be achieved by adjusting the value of CaO/SiO$_2$. A decrease in the amount of both of the above phases signifies an increase in either the di-calcium ferrite perovskite solid solution or the β-wollastonite phase, as can be seen from FIG. 1, and hence reduction in the recovery yield as a resource.

The following example is illustrative of the features of the present invention.

EXAMPLE

SiO$_2$ was added, in an amount of 0.084 kg/slag kg, to molten basic converter slag of a chemical composition shown in Table 3. In this case, the CaO/SiO$_2$ molar ratio of the basic converter slag was 2.0. Then, oxygen gas was blown into the slag in an amount of 0.01 Nm$^3$/slag kg.

| | \multicolumn{7}{c}{Chemical composition} | | | | | | |
|---|---|---|---|---|---|---|---|
| | MgO | Al$_2$O$_3$ | SiO$_2$ | CaO | TiO$_2$ | MnO | Total Fe |
| wt % | 2.27 | 2.01 | 16.98 | 47.45 | 2.19 | 4.99 | 12.46 |

Table 4 shows the mineral phase composition of basic converter slag treated according to the above treatment. In Table 4, a mineral composition of slag is shown prior to the treatment, for comparison purposes.

Table 4

| | (Wt %) | | | |
|---|---|---|---|---|
| | di-calcium silicate | wustite | di-calcium ferrite perovskite solid solution | Mg—Mn ferrite |
| untreated slag | 65 | 23 | 12 | 0 |
| treated slag | 62 | 0 | 10 | 28 |

As is apparent from Table 4, the treated slag according to the process of the invention contains about 30% Mg-Mn ferrite phase, in which iron and maganese components may be present in the form of solid solution, and at least about 60% di-calcium silicate phase, in which phosphorus components may be present in the form of a solid solution, and thus the total percentage of both phases amounts to 90%. On the contrary, the concentration of di-calcium ferrite perovskite solid solution only remains at 10%. The iron and manganese components present in treated slag are well adapted for a magnetic separation process, and detrimental phosphorus components may be removed therefrom with ease. The slag was subjected to a recovery treatment according to the magnetic separation process, and iron and manganese may be recovered in high yields. The results of analysis of the concentrate thus recovered reveal that little or no phosphorous component is present therein.

Accordingly, the process of the invention may be applied to a basic converter slag which contains a great amount of iron and manganese components and from which the recovery of iron and manganese have been impossible in the past. Thus, the basic converter slag may be used as useful resource for the recovery of iron values. In other words, a majority of iron and manganese components are present and retained in mineral phases in the form of a solid solution, which are well adapted for screening and recovery process such as a magnetic separation, while detrimental phosphorous components are retained in a phase other than the phases containing iron and manganese in the form of a solid solution, with the result that iron and manganese components free of phosphorus may be economically recovered in high yields. In addition, a di-calcium silicate phase which is the main mineral constituent other than the iron-manganese-containing phases may be effectively used as a raw material for cement. Instead of magnetic separation process, another recovery process may be employed in the present invention, wherein di-calcium silicate and the like are dissolved in an acid by utilizing the difference in dissolution rates of these mineral phases into an acid. Meanwhile, the slag obtained after the treatment contains no free lime, so that slag will not naturally disintegrate which has been a problem for reclaimed materials, thus finding use as a road building material and the like.

In view of the tremendously large amounts of basic converter slag being produced, the present invention can contribute greatly to the utilization of slag as a high-class precious iron resource, and hence leads to industrial economy.

What is claimed is:

1. A process for treating basic converter slag, comprising the steps of:
    subjecting basic converter slag in a molten state to an oxidation treatment;
    adjusting the basicity of said slag such that the CaO/SiO$_2$ molar ratio ranges from 1.5 to 2.5 by the addition of a material containing SiO$_2$; and then cooling and solidifying said slag, whereby said basic converter slag may be converted into a slag which contains as the main mineral constituents a Mg-Mn ferrite phase and a di-calcium silicate phase, and such that the ratio of iron distributed in said Mg-Mn ferrite phase to the total iron content of said treated basic converter slag is not less than 25%.

2. The process of claim 1, wherein said treated basic converter slag, after cooling and solidification, further contains at least one di-calcium ferrite perovskite solid solution phase and a β-wollastonite phase.

3. The process of claim 1, wherein said oxidation treatment comprises blowing oxygen into slag in an amount of not less than 10 Nm$^3$/ton of molten slag.

4. The process of claim 1, wherein said CaO/SiO$_2$ molar ratio ranges between 1.7 and 2.3, and the ratio of iron distributed in the Mg-Mn ferrite phase to the total iron content of said basic converter slag is not less than 40%.

5. The process of claim 1, wherein said oxidation treatment is applied to said slag after said basicity adjusting treatment.

6. The process of claim 1, wherein said oxidation treatment and said basicity adjusting treatment are applied to said slag at the same time.

7. A method of recovering iron values from basic converter slag which comprises:
    subjecting the basic converter slag prepared by the process of claim 1 to a magnetic force and recovering iron values isolated by said magnetic force.

* * * * *